United States Patent

[11] 3,615,290

| [72] | Inventor | James Nixon<br>Westfield, N.J. |
|---|---|---|
| [21] | Appl. No. | 813,271 |
| [22] | Filed | Apr. 3, 1969 |
| [45] | Patented | Oct. 26, 1971 |
| [73] | Assignee | Esso Research and Engineering Company |

[54] EMULSIFIED HYDROCARBON FUEL
6 Claims, No Drawings

[52] U.S. Cl. ..................................................... 44/51,
44/63, 252/390, 252/308
[51] Int. Cl. ..................................................... C10l 1/32
[50] Field of Search ........................................... 44/51, 63,
68, 70, 71, 73; 252/34, 50, 389, 394, 390

[56] References Cited
UNITED STATES PATENTS

| 2,722,516 | 11/1955 | Merker | 252/389 X |
|---|---|---|---|
| 2,931,804 | 4/1960 | Spivack | 44/63 X |
| 3,240,574 | 3/1966 | Cyba | 44/73 X |
| 3,375,092 | 3/1968 | Sweeney | 44/63 x |
| 3,416,320 | 12/1968 | Asher | 252/308 X |
| 3,449,424 | 6/1969 | Andress et al. | 44/73 X |
| 3,454,380 | 7/1969 | Dickson et al. | 44/73 X |
| 3,458,294 | 7/1969 | Nixon et al. | 44/51 |
| 3,468,802 | 9/1969 | Nail | 44/73 X |
| 3,485,858 | 12/1969 | Gee et al. | 252/389 X |
| 3,489,682 | 1/1970 | Le Suer | 252/389 X |
| 3,490,237 | 1/1970 | Lissant | 44/51 X |

*Primary Examiner*—Daniel E. Wyman
*Assistant Examiner*—W. J. Shine
*Attorneys*—Pearlman and Stahl and Ernest V. Haines ABSTRACT: Stable emulsions of normal liquid hydrocarbon fuels particularly jet gas turbine fuels for aircraft are prepared in which the normally liquid hydrocarbon fuel is emulsified with a minor amount of a polar organic liquid which is immiscible with said normally liquid hydrocarbon fuel. The emulsion of the hydrocarbon fuel is at least 75 wt. percent of the fuel as a dispersed phase, contains at least one nonionic emulsifier, contains a polar organic solvent as the continuous phase and also contains up to and including about 1.5 wt. percent of water. In addition, this emulsion also contains a small amount (from 0.001 up to 1.0 wt. percent of the emulsion of a corrosion inhibitor selected from the group consisting of the alkali metal, alkaline earth metal, ammonium, or hydrazine soaps of normal or branched chain $C_4$-$C_{30}$ alkyl or alkenyl substituted succinic anhydride or succinic acid, the Schiff's bases of hydroxy phenyl aldehydes, oximes, ketones or the hydroxy benzyl aldehydes, oximes or ketones condensed with an alkylene diamine or polyamine, and the aziridyl substituted alkyl amines, diamines, or polyamines.

EMULSIFIED HYDROCARBON FUEL

NOTATION OF GOVERNMENT CONTRACT

The invention herein described was made in the course of or under a contract with the U.S. Army Aviation Material Laboratories.

DESCRIPTION OF THE INVENTION

The present invention relates to improvements in emulsified liquid hydrocarbon fuels wherein at least 75 wt. percent, and preferably at least 97 wt. percent, of the dispersed phase is a liquid hydrocarbon fuel with the remainder being largely the continuous phase immiscible therewith and which is a polar organic liquid. Such an emulsion has been prepared by others using the materials hereinafter set forth in detail including several of the commercially available emulsifiers which have been found to be particularly suitable for the purpose. Until very recently, it has not been thought to be possible to produce an emulsion wherein the dispersed phase of the emulsion could amount to as high as 97 wt. percent or even as high as 99 wt. percent of the total composition with the remainder constituting the emulsifier(s) and the continuous phase. It was, therefore, somewhat surprising and unexpected to discover that such emulsions could be successfully prepared and still more surprising to find that such emulsions are stable for a period of several weeks or even months under conditions including not only storage, but transportation, including pumping with gear or centrifugal pumps or the like.

Emulsions of this type wherein the hydrocarbon fuel is the dispersed phase have been found to possess certain advantages particularly in connection with the emulsification of jet fuels for both civilian and military aircraft. It has been discovered that, by emulsifying jet fuels to the extent that the fuel dispersed phase constitutes from 75 to 99 wt. percent of the emulsion while the continuous phase is largely composed of the remainder of the emulsion, a certain safety factor is incorporated into such fuels because in the crashes of aircraft or in the military operations the impact of enemy projectiles on the aircraft minimized the tendency towards sudden ignition of the atomized and/or vaporized fuel contained in the fuel tanks of such aircraft. Ordinarily, such circumstances result, because of the inherent characteristics of the jet fuels, in fire hazards caused by the bursting, puncturing or rupturing of fuel tanks whereas it has been discovered that when such fuel tanks are filled with stable fuel emulsions which are viscous in nature, the fuel does not readily vaporize or atomize. Such rupturing or puncturing of tanks containing the same, practically reduces to a minimum the tendencies for explosions and burning ordinarily encountered by reason of the military and civilian punctures or ruptures which apply to fuel tanks containing liquid fuels largely because the fuels in emulsion form have eliminated to substantial degrees the tendency of the stored fuel to vaporize or atomize.

In the past, such emulsions containing as much as 97 to 99 wt. percent dispersed fuel emulsions in a continuous phase of nonpolar organic liquids have been quite satisfactory in operation so long as they have been substantially completely devoid of water, i.e. they have been substantially completely anhydrous in nature. As a practical matter, however, in the ordinary storage and transportation of such emulsified fuels, small amounts of water inevitably find their way into such fuels and even though the total amount of water in practical handling and transportation may not exceed one or 1.5 wt. percent of the total emulsified composition, it has been discovered that tremendous corrosion problems arise when such water-containing fuels are in contact with ferrous metals or ferrous-containing metals such as pipes, tubing and the like. Corrosion difficulties become pronounced by reason of the presence of these small amounts of water and the continued contacting of such water-containing emulsions leads to severe corrosion and erosion problems such that from a practical standpoint heretofore precautions had to be instituted to prevent the presence of water or to remove water at each stage of storage, transportation and so forth in order to eliminate or avoid the corrosion problems. It is to this problem that the present invention is directed.

In order to overcome this problem, and with the surprisingly unexpected additional beneficial results achieved, certain corrosion inhibitors have been successfully incorporated into such emulsions. It has been discovered that the presence of these corrosion inhibitors not only markedly reduces the corrosion effects which inevitably occur when even small amounts of water, i.e. below 1 and 1.5 wt. percent of the emulsions are found in these fuel emulsions, but in addition more stable emulsions are obtained by reason of the presence of these small amounts of corrosion inhibitors to the point where better mechanical stability is obtained as well as a minimizing and practical elimination of the corrosiveness of the ferrous metals and alloys thereof is achieved. The beneficial effect of the use of the novel inhibitors goes beyond merely improving the stability of the emulsions but also as a result of their use a lowering of the pressure drop required to pump these inhibitor-treated emulsions through metal pipes is achieved. This means that less powerful gear or centrifugal pumps are necessary for the delivery of any given amount of emulsion to and through fuel injectors of gas turbine engines such as those used in powering jet aircraft or it means that, for the same sized gear or centrifugal pumps, larger given unit volumes of fuel in the form of emulsion are delivered for combustion in such engines because of the reduced pressure drop encountered in pumping such emulsions.

As before stated, the heretofore described fuel emulsions are well known as evidenced by the description set forth in U.S. Pat. No. 3,416,320, patented Dec. 17, 1968 and copending allowed application Ser. No. 623,560, filed Mar. 16, 1967, now U.S. Pat. No. 3,458,294, which disclosures are incorporated herein by reference. The improvement to which the present invention is directed resides in the incorporation into such emulsions, during their process of emulsification, of one or more of the novel corrosion inhibitors hereinafter more fully described, it being understood that the need for such corrosion inhibitors and the advantage of using such corrosion inhibitors are only evident where the emulsions contain water in minor amounts, i.e. preferably to the extent of being present in an amount not greater than about 1.5 wt. percent of the total emulsions. In the heretofore mentioned U.S. Pat. Nos. 3,416,320 and 3,458,294 it is recognized that small amounts of water may be present in such emulsions but heretofore it has not been recognized that even these small amounts of water result in extensive corrosion of metal parts in turbojet engines. Nevertheless, it has now been discovered that metals or metal alloys composed of or containing iron do, in fact, suffer extensive corrosion where the emulsion contains as little as 1.5 wt. percent of water or less therein.

As previously indicated, emulsions containing from 75 to 99 wt. percent of hydrocarbon fuels as a dispersed phase together with a continuous phase of polar organic liquids have been prepared. These emulsions surprisingly have been found to be stable, pumpable and transportable without breaking. They have also been found to be useable directly as fuels for gas turbine aircraft jet engines. The selection of the materials to be employed as the continuous phase has been such that the entire emulsion composition has been combustible, there being only a slight loss of combustion efficiency of the hydrocarbon fuel by reason of the emulsifiers and the continuous phase employed. As previously stated, in those embodiments of the emulsion fuels in which there was some water present, a metal corrosion problem has been found to be present and some added product is needed to overcome this problem even though not more than about 1.5 wt. percent of water is present in the emulsion. As previously stated, it is extremely difficult if not impossible under practical storage and transportation conditions to completely eliminate the presence of water in most hydrocarbon fuels whether they are emulsified or not. The fact that an emulsion is employed makes the likelihood of water being present great and the fact that it has been discovered that certain beneficial emulsion qualities are obtained by reason of the presence of very small quantities of water makes it nevertheless also true that the corrosion difficulties are present and must be counteracted insofar as the use of such hydrous emulsion fuels under practical operating conditions is concerned.

Specifically, it has been discovered that small amounts of selected corrosion inhibitors materially enhance fuel emulsion characteristics and at the same time these inhibitors effectively minimize or eliminate altogether the corrosion difficulties encountered with fuel emulsions of the type hereinbefore specified where those fuel emulsions contain very small amounts, of the order of 1.5 wt. percent or less, of water. These corrosion inhibitors that may be added are those which may be selected from the group consisting of the alkali metal, the alkaline earth metal, the ammonium, or the hydrazine or the substituted hydrazine soaps or salts of normal or branched chain $C_4$—$C_{30}$ alkyl or alkenyl substituted succinic anhydride or succinic acid, the Schiff's bases formed by condensing hydroxy phenyl aldehyde, oxime or ketone or hydroxy benzyl aldehyde, oxime or ketone with an alkylene diamine or polyamine and the mono, di or triaziridyl substituted alkyl amines, diamines, or polyamines.

An emulsion consists essentially of a dispersion of one liquid phase within a second continuous but liquid phase which is immiscible with the first-mentioned phase. It contains a high percentage of an internally dispersed phase within a continuous phase and the fact that the major portion by far of the emulsion is comprised of the dispersed phase and the minor proportion of the emulsion is comprised of the continuous phase, does not alter the physical arrangement of the various phases within the emulsion. Such stable emulsions exhibit a property which, in ordinary liquid phase operation, would be defined as the shear stress or force required as a minimum to get the emulsion to flow within itself at all. This is known as yield stress and might be looked upon as being that force necessary to overcome the viscosity inertia of the stable emulsion. It is measured in dynes per square centimeter and aids in defining the "viscosity" of the stable emulsion. In the following examples, this stress was measured at ambient (room) temperature. The completed emulsion does not flow freely but when a sufficiently large stress is applied, i.e., one exceeding the yield stress, the emulsion does flow readily. If the critical yield stress is exceeded but by only a moderate amount of stress force, the material will flow but it will not become demulsified. The removal of the shear stress permits the emulsion to once again regain its original viscous state without any demulsification having taken place. It is thus possible, in the instant case, to pump the stable hydrocarbon emulsions by conventional fuel pumps without having the emulsion become demulsified by the force applied, as above defined. The shear rate is defined as the relative viscosity of two planes in the emulsion divided by the distance between the planes. This shear rate is initiated by applying a stress in excess of the yield stress. Higher shear stresses produce higher shear rates which in turn bring about emulsification until at some critical shear rate (500,000 sec.[11]) the emulsion undergoes demulsification. Shear rate is measured in terms of reciprocal seconds (sec.[11]). In preparing the emulsions hereinafter described, shear rates ranging between about 1,000 and about 50,000 sec.[11] are employed but the choice of the particular number of reciprocal seconds to be employed is such that emulsification takes place but the shear rate is not sufficiently high to cause demulsification to occur.

The dispersed phase of the emulsion can be any liquid which is substantially immiscible with the liquid employed as the continuous phase. While it is contemplated that the invention is best applicable to the preparation of hydrocarbon fuels as the dispersed phase, it is not limited thereto. Such emulsions have been found to be stable at temperatures ranging from −65° F. to +140° F. for periods in excess of 90 days. The dispersed phase may be a halogenated hydrocarbon such as the perchlorinated or perfluorinated lower alkanes and alkenes. Tetrafluoroethane, tetrachloroethylene, hexachloroethane, the perfluoro butanes and pentanes and the like are examples of liquids that may be emulsified in water or formamide as the continuous phase. Such emulsions find utility as dry cleaning compositions. Where the continuous phase is a lubricating oil and the fluoroalkanes are the dispersed phase, such emulsions are useful as lubricant compositions for hermetically sealed refrigeration systems. Additionally, oxygen-containing derivatives of hydrocarbons such as methyl isobutyl ketone, lauryl alcohol, stearyl alcohol, oleic acid, myristic acid and stearic acid may be the dispersed phase with water or formamide being the continuous phase. If necessary, sufficient heat may be applied during emulsification to insure a liquid phase condition for all the components.

Three components in the form of an admixture are employed in effecting the stable emulsions. They serve as the feed stock to the continuous emulsification process. The component serving as the dispersed phase and which is present from 75 wt. percent to as high as 97 wt. percent in the final emulsion may be any of the aforementioned compounds. In particular, a hydrocarbon fuel having a boiling range within the range of about 70° F. to about 750° F. has been successfully emulsified in accordance with the novel continuous emulsification process herein described. These petroleum fractions such as gas oils, kerosenes, motor gasolines, aviation gasolines, aviation turbojet fuels, diesel fuels, and the like, whether of naphthenic, paraffinic, aromatic, or mixtures of two or more of these three types are particularly preferred feed stocks. Gasoline, of course, may be defined as a liquid hydrocarbon mixture having an initial boiling point somewhere in the range of 70° to 135° F. and a final boiling point somewhere in the range of 250° to 450° F. Motor gasolines normally have boiling ranges between 70° and 450° F. and aviation gasolines normally have boiling ranges between 100° and 300° F. Diesel fuels include those defined by ASTM specification D–975–53T. Jet fuels are generally those hydrocarbon fuels having boiling ranges within the limits of about 150° to 600° F. and are designated by such terms as JP–4, JP–5, JP–6, etc., JP–4 and JP–5 fuels are defined by U.S. Military Specification MIL–T–5624–G. Aviation turbojet fuels boil in the range of 200° to 550° F. and are defined by ASTM specification D–1655–59T. A typical JP–4 jet fuel has a Reid vapor pressure of 2.20, an API gravity of 53.3, a freezing point maximum temperature of −76° F., and ASTM–D–86 distillation distribution of initial boiling point of 140° F., 50 percent boiling point of 326° F., and a final boiling point of 473° F.

Polar organic liquids, i.e., liquids under the emulsification conditions of temperature and pressure obtaining, constitute the second component and are the continuous phase of the emulsion. All of these liquids are, of course, immiscible with respect to the hydrocarbon fuel or hydrocarbon derivative constituting the dispersed phase. These materials are characterized by having dielectric constants greater than 25 and solubility parameters greater than 10. Most of them will have freezing points of 40° F. or lower so that the emulsions will be stable at relatively low temperatures. Representative examples of the compounds which may be employed as the continuous phase are: formamide, dimethyl formamide, dimethyl sulfoxide, dimethyl acetamide, propylene carbonate, formic acid, glycerol, glycidol, ethylene glycol, propylene glycol, 2-pyrrolidone, or mixtures of two or more of such materials. The continuous phase materials can be still further modified and, in many instances are advantageously modified, by adding thereto between about 0.5 percent and 40.0 percent, based upon the weight of the aforementioned continuous phase material, of a material such as urea, oxamide, and guanidine, or other solid amide, provided that the nature of the amide employed and the amount of the amide used are such that when it is added to the aforementioned continuous phase materials or mixtures of materials, the mixture still remains liquid under the emulsification conditions prevailing. A suitable continuous phase constitutes 80 percent formamide and 20 percent urea. The properties of the polar organic material, which expression is intended to include water as compared, for example, with JP-4 jet fuel, are as follows:

| Substance | Freezing point, °F. | Boiling point, °F. | Dielectric Constant | Solubility Parameter [1] |
|---|---|---|---|---|
| Formamide | 32 | 451 | 109 | 18 |
| Dimethyl Formamide | −70 | 392 | 37 | 12 |
| Dimethyl sulfoxide | 65 | 365 | 45 | 13 |
| Formic acid | 47 | 213 | 58 | 12.1 |
| Glycerol | [2]32 | 564 | 45 | 16.5 |
| Ethylene glycol | 1 | 387 | 41 | 14.2 |
| JP-4 jet fuel | <−70 | 140 (IBP) | 2 | 7 |
| Water | 32 | 212 | 80 | 23.4 |

[1] Calculated as square root of energy of vaporization per molar volume, √g. cal/mole/cc. by method of J. H. Hildebrand "Solubility of Non-Electrolytes". 3rd Edition, Reinhold Publishing Corporation, New York, 1950.

[2] Crystallizes slowly at this temperature; melting point of crystals is higher.

The emulsification of a hydrocarbon fuel as a dispersed phase in a continuous phase material, as defined above, is not satisfactorily accomplished without the presence of one or more organic emulsifiers, dispersants or surfactants. The materials successfully used and which are the third component of the emulsion should be essentially non-ash-forming in nature and if traces of them are contained in the fuel after demulsification, they should not form residues in the engines wherein the fuel is combusted; hence the use of nonmetallic emulsifiers is desirable. The best balance of forces of attraction between the hydrocarbon dispersed phase and the continuous phase of the emulsion is obtained by using a combination of two or more emulsifiers. The selection of the emulsifier is, therefore, best undertaken by attaining a proper balance of forces as between lipophilic and hydrophilic properties in the emulsifier system. This is conveniently arrived at through the use of the scale of HLB values known and conventionally considered in the emulsifier art. These values are discussed by W. C. Griffin in the Journal of the Society of Cosmetic Chemistry, Dec. 1948; p. 419; also in Kirk-Othmer Encyclopedia of Chemical Technology, second edition, vol. 8, pp. 131–133 (1965). Desired HLB values can be obtained by using two or more emulsifiers in combination. Emulsifiers and emulsifier combinations which give HLB values in the range of 11–16 are satisfactory for producing a stable emulsion in the present invention when the continuous phase material is formamide. Generally, HLB values of about 13 are used practically. The specific combination of emulsifiers used in the examples had an HLB value of 13.2. Formamide gives the greatest latitude in the selection of emulsifiers that may be used. Mixtures of formamide and solid amides, such as urea, appear to give the most satisfactory emulsions when using nonionic emulsifiers having HLB values in the 11–14 range. With polar organic liquids that are used in conjunction with the amides or with small amounts of water, with ethylene glycol, for example, the effective HLB value will depend on the particular liquid selected and will vary with the proportion of water or amide to the said organic liquid constituting the continuous phase.

Among the surfactants or emulsifiers that may be employed in the present invention are included alkylphenyl polyethylene glycol ethers such as Tergitol NPX of Carbide and Carbon Company; polyethylene polyoxypropylene glycol such as Pluronic L-64 of Wyandotte Chemical Company; rosin acid esters of polyoxyethylene glycol such as Ethofat 242/25 of Armour Industrial Chemical Company; and alkylphenyl polyethoxy alkanols, such as Triton X-102 which is iso-octyl phenyl polyethoxy ethanol, i.e., the reaction product of iso-octylphenol and ethylene oxide. The alkyl phenyl polyalkoxy alkanols are obtained by reacting five to 15 molar proportions of a $C_2$ to $C_3$ alkylene oxide with one molar proportion of an alkyl phenol having a $C_5$ to $C_{12}$ alkyl group, e.g., the reaction product of six moles of propylene oxide with one mole of dodecyl phenol, the reaction product of a mixture of five moles of ethylene oxide and five moles of a propylene oxide with one mole of nonyl phenol, and the reaction product of eight to 10 moles of ethylene oxide with one mole of iso-octyl phenol. These are included within a broader class of materials having the formulas:

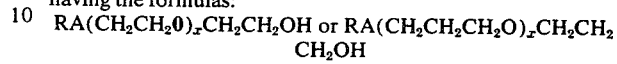

where R is a $C_8$ to $C_{18}$ hydrocarbon group, A is oxygen or sulfur and X is 8 to 20. In the following examples, a mixture of emulsifiers was used, namely, ethoxylated tridecyl alcohol (eight moles of ethylene oxide per mole of alcohol) hereinafter denoted (ETDA) and sorbitan monooleate (SO) admixed with ethoxylated sorbitan monooleate (ESO) a commercially available nonionic emulsifier identified as Atlas IL-851. The admixture had a number average molecular weight of about 2,500.

Other emulsifiers include the fatty acid esters of sorbitan, such as sorbitan monolaurate, sorbitan monostearate, sorbitan monopalmitate and the alkoxylated fatty acid esters of sorbitan such as polyoxyethylene sorbitan monostearate, tristearate or trioleate. The various sorbitan esters of fatty acids are well known to the art as Spans, and the polyoxyethylene derivatives of the sorbitan esters of fatty acids are well known as Tweens. Still other suitable emulsifiers include N-alkyl trimethylene diamine dioleate of Armour and Company, octakis (2-hydroxy propyl) sucrose, the condensation products of fatty acid amides and ethylene oxide, the ethoxylated fatty alcohols, polyoxyethylene monostearate, polyoxyethylene monolaurate, propylene glycol monooleate, glycerol monostearate, ethanolamine fatty acid salts, stearyl dimethyl benzene ammonium chloride, various gums such as gum tragacanth, gum acacia, etc.

An extensive list of emulsifiers together with their HLB values is given in Kirk-Othmer Encyclopedia of Chemical Technology, second edition, vol. 8, pp. 128–130 (1965). From this list it is possible to select those that either alone or in admixture will give an HLB value suitable for use in the present invention.

The liquid emulsions of the present invention using formamide, formamide-solid amide mixtures, formamide-glycol mixtures and the like, as the continuous phase, are compounded to produce the following broad and preferred ranges of components:

| Component | Wt. Percent Concentration Broad | Preferred |
|---|---|---|
| Dispersed phase | 75–99 | 85–97 |
| Continuous phase | 0.5–24 | 2.0–12 |
| Emulsifier | 0.25–10 | 0.5–2.5 |

A preferred emulsion constitutes about 97 wt. percent of dispersed phase, about 2 wt. percent of continuous phase, and about 1 wt. percent of emulsifier.

The above ranges are not necessarily attainable without regard to the specific types of substances selected for use as the three initial components of the emulsion. Thus where JP-4 jet fuel is the dispersed phase component and a mixture of formamide containing 20 percent urea constitutes the continuous phase component, the ranges may be over the entire range above stated, whereas, if JP-4 fuel is the dispersed phase and formamide containing 35–40 percent urea is the continuous phase, the selection of the relative amounts of dispersed phase would require that in producing a stable emulsion it would contain a final concentration of the dispersed phase toward the lower end of the above stated ranges while the continuous phase would be correspondingly toward the higher end of the amounts specified in the above ranges.

A particularly preferred jet fuel emulsion comprises at least 97 wt. percent of a hydrocarbon fuel as a dispersed phase, a continuous phase of between about 1.5 and about 2 wt. percent of formamide, about 0.5 to about 1 wt. percent of water, up to about 1 wt. percent of nonionic emulsifier, and up to about 1 wt. percent of corrosion inhibitor. More particularly, the jet fuel emulsion can contain about 1.6 wt. percent of formamide, between about 0.2 and about 0.4 wt. percent of urea, about 0.5 wt. percent of water, between about 0.3 and about 0.7 wt. percent of equal amounts of sorbitan monooleate and ethoxylated sorbitan monooleate, between about 0.1 and about 0.2 wt. percent of ethoxylated tridecyl alcohol obtained from one mole of the alcohol and 8 moles of ethylene oxide, and about 0.1 to about 0.2 wt. percent of the corrosion inhibitor.

The components of the emulsion can be added in any order desired or all of them can be added simultaneously as an admixture. It is preferred for best results and insofar as emulsion stability is concerned that all of the emulsifiers to be employed are first added to the continuous phase including the corrosion inhibitors. Then, the hydrocarbon fuel is added to the continuous phase at a rate of about 10 cc. per minute. Additionally and after the first minute or two the hydrocarbon fuel is increased by increments of 10 cc. per minute until a rate of 40 cc. per minute is reached. The additional rate is then held at 40 cc. per minute for 40 minutes until the emulsion is completed. Thereafter, the required amount of water not to exceed 1.5 wt. percent of the total emulsion is added and the emulsion is mixed for an additional 3 minutes. A modification of this process is possible but is only used where the total amount of emulsifiers added is 0.6 wt. percent or less. If it is greater than 0.6 wt. percent total emulsifiers, the method just described is used. In the variation of the method just described, the emulsifiers are added to the continuous phase if they are water-soluble but if they are oil-soluble, they are added to the hydrocarbon fuel prior to its addition to the continuous phase. In other respects, the emulsification process is as previously described. High-speed blenders or colloid mills are generally not used. Preferably impeller stirrers or gear pumps having stirrers or gears of a peripheral speed of 0.5 to not more than about 5 feet per second are used. A low speed (e.g. 150–300 r.p.m.) stirrer is desirable for the emulsification.

The corrosion inhibitors, as before mentioned, which have been found to be most effective in combating the problem of metal corrosion, especially where small amounts of water are also present in the emulsions, may be any one or more of the following: the normal or branched chain $C_4$–$C_{30}$ alkyl or alkenyl substituted succinic anhydrides or succinic acids or they may be the same compounds in the form of their soaps or salts with alkali metals, alkaline earth metals, the ammonium radical, or hydrazine. The alkali metals are selected from the group consisting of lithium, sodium and potassium and the alkaline earth metal is most generally either barium or calcium. The $C_4$–$C_{30}$ alkyl or alkenyl substituted succinic anhydride or corresponding succinic acid is prepared by reacting an olefin such as isobutylene or a polymer of a $C_4$–$C_6$ alpha-monoolefin or the chloro derivatives thereof with succinic anhydride or maleic acid. By such a process, the corresponding polymeric alkenyl substituted anhydride or acid is produced. A simple catalytic hydrogenation of such compounds will produce the corresponding alkyl substituted acid or anhydride. Alkylation of succinic anhydride or maleic acid with an olefin or an olefinic polymer is a well-known reaction and is brought about by the condensation or alkylation of maleic acid or succinic anhydride with the olefin or olefin polymer involving heating, with agitation, for a period of from 10 to 20 minutes under superatmospheric pressure of these reactants, under reflux conditions, at a temperature of about 350° to about 390° F. This reaction can be carried out as a thermal alkylation or it can be carried out as a catalytic alkylation in which case an alkylation catalyst such as aluminum chloride, boron trifluoride or concentrated sulfuric acid (98 percent) is conventionally employed. Lower temperatures and shorter reaction times than those heretofore mentioned are employed if a catalytic alkylation is conventionally carried out. In the following examples the tetramer of propylene, i.e. a branched chain tetrapropylene succinic anhydride is employed. This is hereinafter designated as dodecenyl succinic anhydride (DDSA). This material, as such, or neutralized with a lithium oxide, lithium hydroxide or lithium carbonate in equimolar amounts with the acid or anhydride or up to 2 moles of the lithium compound per mole of the anhydride or acid is employed to produce the corresponding mono or di lithium salts. The corresponding sodium, potassium, calcium or barium salts may also be used. Additionally, the neutralization or partial neutralization may be accomplished with ammonium hydroxide or ammonium carbonate. Similarly, the hydrazine salt or soap of the alkenyl or alkyl substituted succinic anhydride or corresponding acid is obtained by treating the acidic component with up to 2 moles of hydrazine per mole of acid component. The alkenyl group may be tetradecenyl, octadecenyl, octaeicosenyl, or the like, depending upon the particular alpha-monoolefin polymer employed and the degree of polymerization occurring. Generally, however, when an olefinic polymer is employed, a branched chain alkenyl configuration results. Actually, either a straight chain or branched chain alkyl or alkenyl group may be employed but the alpha-olefin polymers of the lower alpha-monoolefins, i.e. $C_3$–$C_6$ alpha-monoolefins, are produced commercially and are, therefore, the most readily available.

The Schiff's bases of hydroxy phenyl aldehyde, ketone or oxime and the Schiff's bases of hydroxy benzyaldehyde, ketone and oxime, each condensed with an alkylamine or an alkylene polyamine have likewise been found to be corrosion inhibitors in the instant emulsions. These are prepared by condensing the corresponding aldehydes, ketones or oximes, in conventional manner, with the selected specific amine. Thus, for example, salicylaldehyde is condensed with propane diamine-1,2 by employing 2 moles of the aldehyde per mole of the diamine. Any alkyl or alkylene group of from one to six carbon atoms may be employed. A similarly useful compound is prepared by condensing 1 mole of salicylaldehyde with 1 mole of paraamino phenol. In place of salicylaldehyde, one may use salicylaldoxime, 2-hydroxy acetophenoxime or the condensation product of 2-hydroxy 3-methoxy benzaldehyde. These Schiff's bases and their method of preparation are shown in U.S. Pat. No. 3,080,223 in column 3.

Additionally, it has been discovered that the aziridyl substituted alkyl amines are also extremely useful as corrosion inhibitors in the instant emulsions. These are prepared by the reaction of ethylene imine with various alkyl primary or secondary monoamines and various alkylene polyamines. The reaction of ethylene imine with methyl amine or ethylene diamine is generally carried out using 5 moles of ethylene imine with 20 moles of the amine with reaction temperatures being between about 20° and about 40° C. for a period of time ranging between about 4 and about 24 hours. Typical specific amines which may be treated with ethylene imine are as follows: methylamine, ethylamine, diethylamine, ethylene diamine, N-ethyl ethylene diamine, tetraethylenepentamine, triethylene tetraamine and the like. Specifically, tris aziridyl methylamine is employed in the following examples. It was prepared as follows:

5.2 moles of aziridine were reacted with 5 moles of paraformaldehyde in one liter of benzene at 40° C. External cooling was used to maintain the temperature at 40° C. The aziridylmethanol formed was reacted, in situ, by the slow addition of 20 moles of gaseous ammonia at 25° C. over a 4-hour period. The product was subsequently vacuum distilled at 0.3 mm. Hg. pressure. The resultant product had a refractive index, $n_D20$ of 1.4908 and had the following compositions: C 59.20 percent; N 30.83 percent; and H 9.96 percent.

The amount of corrosion inhibitors used can range from about 0.001 percent up to about 1 wt. percent, and will generally be between about 0.01 and about 0.5 wt. percent based on the base emulsion, preferably between about 0.1 and about 0.35 wt. percent on the same basis. The above-mentioned corrosion inhibitors are the preferred ones because, under the most severe atmospheric temperature conditions encountered, they are substantially completely capable of eliminating metal corrosion. Other compounds have been found to be corrosion inhibitors but to a lesser extent and to a more moderate degree, for example, the ammonium salts of mono or di $C_{16}$–$C_{18}$ alkyl phosphoric acid, and the ammonium salt of a $C_8$ Oxo phosphoric acid ester formed by reacting 1 mole of phosphorus pentoxide with 4 moles of isooctyl alcohol produced by the conventional Oxo process. Also the alkylated benzene sulfonates of alkali metals or alkaline earth metals have been found to be useful. These are prepared by alkylating benzene sulfonic acid with the conventional propylene tetrapolymer followed by neutralization of the sulfonic acid with the appropriate alkali metal or alkaline earth metal base. A moderately effective corrosion inhibitor is the ethylene diamine dinonyl naphthalene sulfonate disclosed in U.S. Pat. No. 2,923,611. Its method of preparation is also disclosed in that patent. However, the specifically preferred corrosion inhibitors which have been found to be most effective and which have been found to completely eliminate corrosion under most conditions encountered are branched chain dodecenyl succinic anhydride, its fully neutralized lithium salt, hydrazine salt, or ammonium salt, the Schiff's bases, e.g. N,N'-disalicylidene-1,2-propane diamine and trisaziridyl methylamine. In all cases involving the use of dodecenyl substituted succinic anhydride, as the free anhydride, or as its corresponding salt or soap thereof, the dodecenyl radical was branched chain in character although the straight chain or linear dodecenyl substituted corresponding compounds are effective but to a somewhat lesser degree.

Some of the heretofore mentioned corrosion inhibitors exhibit greater solubility in the hydrocarbon or dispersed phase than in the continuous or polar compound phase and some of the corrosion inhibitors show the reverse characteristics. In any event, since the emulsifier must either solubilize or disperse the corrosion inhibitor and since the emulsifier for the most part is preferably added to the continuous phase, the use of coupling agents is oftentimes advantageous. Examples of these agents are butyl alcohol, the $C_5$–$C_{12}$ alkyl substituted phenols, or polyols, such as 2-tertiary amyl, 4,6-dimethy phenol, mixed nonylphenols, mixed dodecylphenols, isooctyl phenols, bis-phenol A, 4,4'-isopropylidene diphenol, 2,2-bis (2-hydroxy-3-tertiary butyl-5-methylphenyl) propane, 2,2-di (p-OH phenyl) propane, bis (2-hydroxy-3-tertiary butyl-5 methylphenyl) methane, 4-amino-2,6-dimethylphenol, 2-dodecyl phenol, and the like.

The action of these coupling agents may generally be described as follows: in general "like substances dissolve like substances." The scientific basis used for explaining this general observation has been the Hildebrand solubility parameter concept. See Hildebrand & Scott, "The Solubility of Nonelectrolytes," 3rd Edition, Reinhold Publishing Corp., New York (1950). Hildebrand defined solubility parameter ($\delta$) as a numerical constant which is characteristic for each solvent. Refinement of the concept has led to the realization that solubility involves three parameters of the solvent and solute. The three components interact (Vectorial sum) to give the solubility parameter ($\delta$). The components of the solubility parameter ($\delta$) are designated $\delta_d$, $\delta_p$, and $\delta_H$. Where $\delta_d$ is the component of the solubility parameter due to the London dispersion forces of the solvent; $\delta_p$ is the component due to the polar forces of the solvent; and $\delta_H$ is the component due to hydrogen bonding. The solubility parameter ($\delta$) is defined as the square root of the energy density of the solvent. Thus, for solubility between two solvents there must be a reasonable matching of all the solubility parameter components. Therefore, a match between the solubility parameter (Vector sum of the components) of solvent, which results in mutual solubility in many cases, is not a sufficient condition for mutual solubility of the solvents. The components of the solubility parameter of the two solvents must also be reasonably matched to insure mutual solubility of the solvents.

A coupling agent is thus a substance which can be used to change the relative magnitudes of the components of the solubility parameter of the solvent to more closely match those of the solute (second solvent). The coupling agents cited above are such materials. The table below showing the solubility parameter components for butyl alcohol and formamide is set forth to further illustrate the point.

|  | $\delta$ | $\delta d$ | $\delta p$ | $\delta H$ |
| --- | --- | --- | --- | --- |
| n-Butyl Alcohol | 11.30 | 7.81 | 2.8 | 7.7 |
| Formamide | 8.4 17.8 |  | 12.8 the 9.3 |  |

Thus by mixing n-butyl alcohol and formamide one can effectively produce a solvent having a solubility parameter (cohesive energy density) of the polar component between 11.30 to 17.8 and 2.8 to 12.8, respectively, without changing the London dispersion component ($\delta_d$) or the hydrogen bonding component ($\delta_H$) of the solvent appreciably. Therefore, if the solute had its hydrogen bonding and London dispersion components similar to the formamide, but a lower solubility parameter ($\delta$) (more hydrophobic), and a somewhat lower polar component ($\delta_p$), it would be possible to solubilize such a solute with the solvent system, formamide and butyl alcohol. For example, a 50:50 blend of these two solvents would have approximately the following solubility parameters: $\delta$=14.55; $\delta_d$=8.1; $\delta_p$=7.8; $\delta_H$=8.50. Thus by use of a coupling agent (butyl alcohol), the $\delta_p$ and $\delta$ of formamide have been effectively changed without any appreciable change in $\delta_d$ or $\delta_H$.

By way of illustration, but in no way limiting the invention, the following specific examples are set forth.

TABLE

| Example | Corrosion inhibitor | Weight percent corrosion inhibitor | Yield stress, dynes/cm.[2] at room temp. | | | Stability, percent separation | | Corrosion,[3] mild steel, wt. loss, mg./in.[2] | | Conductivity, initial, microamps[1] | Pressure drop p.s.i.g.[4] |
| --- | --- | --- | --- | --- | --- | --- | --- | --- | --- | --- | --- |
|  |  |  | Initial | One week | 30 days | Vibration, 8 hours | Standing, 30 days | 140° F. 1 week | 30 days |  |  |
| 1 | (Anhydrous) none |  | 2,700 | 1,400 | 1,150 | 5 (30 min.) | 0.0 | 0.5–2.5 |  | 70 |  |
| 2 | (Hydrous) none |  | 2,300 | 1,900 | 1,650 | 0.0 | 0.0 | 11.0 |  | 143 | 90, 4, 3 |
| 3 | Lithium salt of branched chain dodecenyl succinic anhydride. | 0.10 | 3,400 | 1,450 | 1,135 | 0.0 | 0.0 | 0.0 | 0.0 | 1,150 |  |
| 4 | Hydrazine salt of branched chain dodecenyl succinic anhydride. | 0.10 | 5,100 | 1,525 | 2,100 | 0.0 | 0.0 | 0.8 | 0.0 | 500 | 11, 6.5, 3.0 |
| 5 | Ammonium salt of branched chain dodecenyl succinic anhydride.[2] | 0.15 | 4,050 | 1,450 | 1,145 | 0.0 | 0.0 | 2.2 |  | 245 |  |
| 6 | Trisaziridyl methyl amine. | 0.10 | 3,120 | 2,100 | 1,400 | 0.0 | 0.0 | 0.5 | 0.0 | 385 |  |
| 7 | Same as Example 6, plus branched chain dodecenyl succinic anhydride. | 0.08 0.02 | 4,100 | 2,225 | 1,250 | 0.0 |  | 0.13 | 0.0 | 265 |  |
| 8 | N,N'-disalicylidine 1,2-propane-diamine. | 0.10 | 2,900 | 2,185 | 1,900 | 0.0 | 0.0 | 0.8 | 0.0 | 185 | 20, 2.8, 2.5 |

¹ Is a measure of the degree of dispersion, the higher the reading, the greater the degree of dispersion with smaller droplets being formed and more efficient "packing" of the dispersed phase being effected.
² Base emulsion contained 1.8% formamide, 0.20% urea, 0.4% SO+ESO, 0.16% ETDA, and 0.5% water.
³ The corrosion test with mild steel for the 30-day period was carried out at room temperature.
⁴ Flow rate was 0.102 cc/sec. through a tube 4 feet long, of 1/8 inch internal diameter using a viscometer apparatus (ASTM D-1092) equipped with the 1/8 inch pipes or tubes in place of the capillaries: the first reading (on the left), was when using a stainless steel tube, the second reading (middle) was when using a Teflon tube, and the third reading (on the right), was when using a polyethylene tube.

EXAMPLES

In all of the following comparative emulsions (all percentages are weight percent), the base emulsion was composed of 97.0 percent JP-4 jet fuel, as the dispersed phase, 0.4 percent of urea and 1.6 percent of formamide as the continuous phase, 0.6 percent of Atlas IL-851 emulsifier (M.W. 2,500) which was a mixture of sorbitan monooleate (SO) and ethoxylated sorbitan monooleate (ESO) and, 0.4 percent ethoxylated (eight moles), tridecyl alcohol (ETDA) (one mole) as an emulsifier. The mixed emulsifiers had an emulsifier HLB value of about 13. All emulsions were prepared and their characteristics measured at room temperature, unless otherwise noted. All emulsions contained 0.5 percent of $H_2O$, except for example 1. The water added, as well as the weight percent of the corrosion inhibitors added, was based on the weight of the total base emulsion as above described, i.e. without the amounts of additives being considered in computing the percentages of the ingredients present in the base emulsion.

Example 2, which shows a base emulsion containing 0.5 wt. percent additional of water, indicates a highly corrosive emulsion as evidenced by the fact that in one week at 140° F. 11 milligrams per square inch weight loss by corrosion occurred when the emulsion was in contact with a mild steel. The completely anhydrous based emulsions showed, under the same conditions, from 0.5 to 2.5 milligrams per square inch weight loss due to corrosion of mild steel. In all cases using the various corrosion inhibitors, vast improvements over the anhydrous and hydrous control emulsions occurred as to corrosive weight losses. The lithium salt (example 3) proved to be a highly effective corrosion inhibitor as was the trisaziridyl methylamine alone or in combination with the free branched chain dodecenyl succinic anhydride. The Schiff's base of salicylaldehyde with 1,2-propane diamine was likewise quite effective as a corrosion inhibitor and the hydrazine salt of the branched chain dodecenyl succinic anhydride proved equally effective. It is believed that in the case of the ammonium salt of the branched chain dodecenyl succinic anhydride, this salt competed for the absorption of the interface with the ETDA or perhaps the film formed at the interface between the dispersed and continuous phase so expanded it that the efficiency of the ammonium salt in protecting the steel surfaces was greatly minimized. This condensation of the film interface by reason of the presence of the ammonium salt made it a somewhat less effective barrier to corrosion. All of the inhibitors discussed and shown in the table with the exception of the Schiff's base (example 8) were readily soluble in the continuous phase of the emulsions. The Schiff's base, however, was not too soluble in the continuous phase. It is believed that this inhibitor becomes dispersed into droplets in the continuous phase by reason of the combined emulsifiers present. Nevertheless, regardless of the action that takes place, the use of 0.1 percent of the Schiff's base shown in example 8 is an effective corrosion inhibitor either in the presence of 0.5 wt. percent water or, somewhat less so, when the emulsion also contains a total of at least 1 percent of an emulsifier or a combination of emulsifiers.

The conductivity data in the table above show that the presence of the corrosion inhibitor in every case increases emulsion conductivity. This means that the degree of dispersion in the emulsions containing the inhibitors is greater. Since this is the case, one can expect that the droplets in such emulsions are under much less strain and the resultant emulsions tend to be somewhat more stable, particularly to mechanical forces, e.g. vibrations. This is evidenced by the relatively poor vibration stability for the emulsion of example 1 which has the lowest conductivity and the relatively good vibration stability for the other emulsions which have higher emulsion conductivity.

The present invention having now been fully described and illustrated, what is desired to be secured by Letters Patent is:

I claim:

1. An emulsified hydrocarbon fuel comprising a dispersed phase of from about 75 to 99 wt. percent of a liquid hydrocarbon boiling within the range of about 70 to about 750° F., from about 0.5 to about 24 wt. percent of a polar organic liquid as the continuous phase, substantially immiscible with the dispersed phase, said polar liquid having a dielectric constant greater than 25 and a solubility parameter in excess of 10, from about 0.25 to about 10 wt. percent of emulsifier capable of forming said emulsion, a minor amount of water not exceeding 1.5 wt. percent of the total composition, and from about 0.001 to about 1 wt. percent of corrosion inhibitor selected from the group consisting of aziridyl-substituted alkyl monoamine, aziridyl-substituted alkylene diamine, and aziridyl-substituted polyalkylene polyamine.

2. Emulsified fuel as defined by claim 1 wherein said liquid hydrocarbon is a jet engine fuel.

3. Emulsified fuel as defined by claim 1 wherein said corrosion inhibitor is trisaziridyl methyl amine.

4. Emulsified fuel as defined by claim 1 wherein the amount of corrosion inhibitor present is between about 0.01 and about 0.5 wt. percent of the total emulsion.

5. A jet fuel emulsion comprising at least about 97 wt. percent of a hydrocarbon jet fuel as a dispersed phase, a continuous phase of about 1.5 to about 2 wt. percent of formamide, about 0.5 to about 1 wt. percent of water, up to about 1 wt. percent of a nonionic emulsifier, and up to about 1 wt. percent of a corrosion inhibitor selected from the group consisting of aziridyl-substituted alkyl monoamine, aziridyl-substituted alkylene diamine, and aziridyl-substituted polyalkylene polyamine.

6. A jet fuel emulsion as defined by claim 5 wherein the emulsion contains about 1.6 wt. percent of formamide, between about 0.2 and about 0.4 wt. percent of urea, about 0.5 wt. percent of water, between about 0.3 and about 0.7 wt. percent of equal amounts of sorbitan monooleate and ethoxylated sorbitan monooleate, between about 0.1 and about 0.2 wt. percent of ethoxylated tridecyl alcohol obtained from 1 mole of the alcohol and about 8 moles of ethylene oxide, and about 0.1 to about 0.2 wt. percent of the said corrosion inhibitor.